June 4, 1935.  F. G. CORNELL, JR  2,003,427
TREATMENT OF CREAM
Filed Jan. 10, 1934
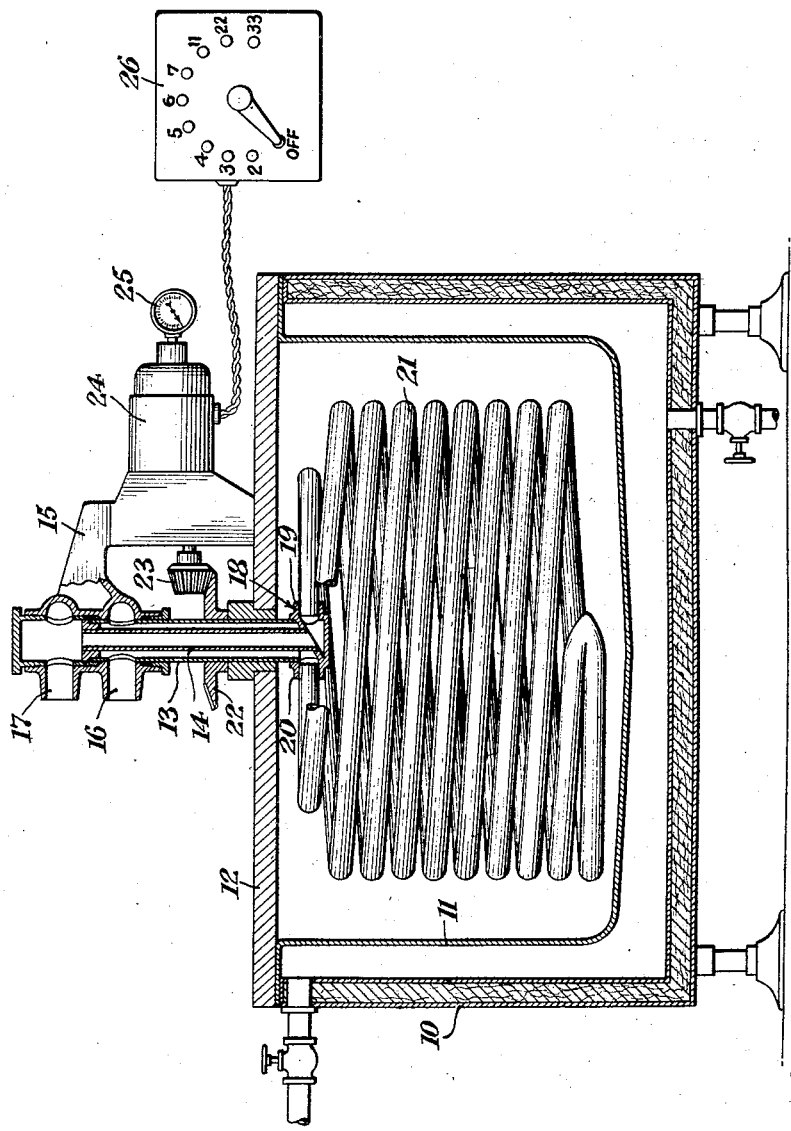
INVENTOR
Fritz G. Cornell Jr
BY Kenyon & Kenyon
ATTORNEYS.

Patented June 4, 1935

2,003,427

UNITED STATES PATENT OFFICE 2,003,427

TREATMENT OF CREAM

Fritz G. Cornell, Jr., Mountain Lakes, N. J.

Application January 10, 1934, Serial No. 706,029

16 Claims. (Cl. 99—11)

This invention relates to the treatment of cream to increase its viscosity.

In average commercial cream at normal atmospheric temperatures, butter fat is present in the form of clusters of numerous closely adhering globules, which originally were suspended in the milk serum in a uniformly dispersed state, but such natural, uniform dispersion was lost because of agglomerating influences brought about through concussion applied to the cream as it came in contact with numerous devices used in its previous treatment, such as milking machine, pre-cooling machine, separating machine, transportation machine, etc.

It has been observed that when cream is heated, the butter fat clusters are caused to separate materially from each other with the result that more uniform distribution of individual butter fat globules throughout the serum is obtained. This is particularly true during pasteurization of cream in which case the butter fat globules again assume a highly dispersed state, particularly at the high temperature required for efficient and satisfactory pasteurization.

It is obvious that uniformly dispersed globular fat results in higher cream viscosity than would be the case were the fat in the form of few but large clusters. Thus the high pasteurizing temperature produces a dispersed condition of the fat which would be a desirable condition to retain in the cream after cooling with consequent higher viscosity than would be the case with non-uniform distribution of the fat globules. But heretofore in the heating and cooling required for the pasteurization of cream, it has not been possible to retain this desirable uniform dispersion of butter fat globules in the cream after cooling.

Usually, during batch pasteurization, cream is heated and cooled by means of a moving agitator, through which a heating and then a cooling fluid is passed in indirect heat exchange relation to the cream, or the agitator may propel the cream against a fixed surface through which indirect heat relation exists with the cream; the agitator in such cases is usually operated at constant speed, or if at a varied speed, its speed is increased to offset or counteract the ordinary increase in viscosity from cooling and consequent sluggishness of flow due to reduction of temperature. This, however, subjects the fat globules to substantial concussion. At temperatures above its melting point, butter fat is not particularly susceptible to agglomeration by concussion, but at temperatures below its melting point and particularly at temperatures below its congealing point butter fat becomes progressively susceptible to agglomeration. Therefore as the cream cools, the butter fat globules impelled by the uniform or increased concussion are caused to become reclustered to an even greater extent than in raw unpasteurized cream; consequently, the pasteurized cream reverts to a condition of non-uniform fat dispersion and loses considerable of its potential and very much desired high viscosity.

An object of this invention is a physical procedure by which the effect of concussion imparted to the cream during cooling is minimized in order to obtain high final viscosity in the product.

According to the present invention, the degree of agitation to which the cream is subjected during cooling, and also sometimes during heating, is controlled and is regulated according to the characteristics of the cream, particularly its reaction to being benefited by such controlled agitation. At temperatures used during pasteurization, cream is subjected to the usual and heretofore ordinary degree of agitation. However, in this case as the temperature of the cream drops, the speed of the agitator is materially reduced, thereby decreasing the violence of agitation, which in turn directly decreases the degree of concussion to which the butter fat globules are subjected. Decrease in the speed of the agitator is continued as the temperature of the cream drops until the final cooling temperature is reached. In cream cooled as above described, the butter fat is more generally dispersed, and consequently the cream has a greater degree of viscosity than is the case where pasteurized cream is agitated during cooling according to the prior standard procedures.

Other objects, novel features and advantages of this invention will be apparent from the following specification and accompanying drawing, wherein the single figure discloses one form of apparatus for treating cream according to the invention.

A frame or box 10 constitutes a jacket for a vat 11 arranged within the frame and having a cover 12. A tubular shaft 13 is rotatably supported by the cover 12 and within the tubular shaft 13 is arranged a tube 14. Both the tubular shaft 13 and the tube 14 project into and are rotatably supported by the head of a bracket 15 which is carried by the cover 12. The bracket 15 is provided with an outlet port 16 communicating with the annular space between the tube 14 and the tubular shaft 13 and with an inlet port 17 communicating with the upper end of the tube 14. The lower ends of the shaft 13 and tube 14 are connected to a casting 18 having hollow radially extending arms 19 and 20 communicating respectively with the tube 14 and the space between shaft 13 and tube 14. A double coil 21 has one end extending into the arm 19 and the other end extending into the arm 20. Liquid passing through the inlet 17 flows down the pipe 14 through the arm 19 into one end of the coil, downwardly through one helix of the coil, upwardly through the other helix, through the arm 20 into the space between the shaft 13 and tube 14, and out the port 16.

A bevel gear 22 is fixed to the shaft 13 and meshes with a pinion 23 which is driven by means of a motor 24 through suitable gearing (not shown). A tachometer 25 is driven by the motor and is calibrated to give direct reading of the number of revolutions per minute of the coil 21. A rheostat 26 is provided for controlling the speed of the motor 24, and if desired, may be so designed that various predetermined positions of the handle will result in different definite rotational speeds of the coil.

The apparatus above described may be advantageously used in practicing the invention, in which case a batch of cream is introduced into the vat 11 and steam or other heating medium is passed through the coil 21 which is rotated so as to agitate the cream while heating. During the heating operation the agitator may be rotated at a high or other desirable speed and its rotation so continued until the cream has been raised to the desirable pasteurizing temperature. A maximum speed of rotation is permissible above temperatures at which butter fat melts as it is not susceptible to agglomeration above such temperatures; consequently a relatively high speed of the agitator facilitates rapid transfer of heat to the cream. During the heating operation, a suitable heating medium may be passed through the jacket 10 in heat exchange relation to the cream within the vat 11 to assist the agitator in heating the cream.

After pasteurization has been effected, the cream is cooled by rotation of the agitator and with suitable cooling medium passing through the coil 21, and suitable cooling medium is passed through the jacket in heat exchange relation to the cream in the vat 11. At the beginning of the cooling operation, the coil is generally rotated at the same maximum speed used in final heating, for example, 33-R. P. M. or such lower speed as is found advisable. Such rotational speed is maintained during the first part of the cooling operation and continued until the temperature of the cream drops to that of approximately the melting point of butter fat. At such temperature just slightly above the melting point of butter fat, the rotational speed of the agitator is decreased to, say, 22-R. P. M., and the cooling operation continued until a temperature is reached that is approximately at the congealing point of butter fat, whereupon the speed of the coil is again decreased, this time, however, to approximately 11-R. P. M., which speed is maintained until the cream temperature reaches that of approximately 70° which is slightly above the temperature at which churning or agglomeration may be expected to commence. Consequently, at this stage of cooling, the speed of the agitator is still further reduced to approximately 7-R. P. M.; thus still further decreasing the concussion to which the butter fat is subjected so as to minimize reclustering of fat which, if not prevented, destroys the dispersed condition of the fat globules, thereby causing loss of viscosity in the finished product. Later the coil speed is gradually decreased until sometimes it is reduced to as low as 2-R.P.M., particularly when cream is cooled to exceedingly low and unusual temperatures and also when it may be found that the cream is particularly susceptible to churning tendencies. The temperature of the cooling medium may be dropped as the cooling proceeds or different cooling media of progressively lower temperature may be used. The melting temperature of butter fat as well as the congealing temperature of butter fat varies according to the breed of cow from which it is obtained, the feed used, the period of lactation, the season of the year and other factors.

Cream cooled by the above described process has a body of greater viscosity than when the previously known processes of pasteurization and cooling were used. Furthermore, cream cooled by the above process has a viscosity almost equal to that of raw cream, whereas the ordinary processes materially reduce the viscosity of the processed cream below its orginal viscosity. In this new method of controlled agitation, the cooling operation does not appreciably alter the maximum dispersion of fat globules produced by the high temperature of pasteurization, a condition much desired but heretofore unobtainable. The concussion thru agitation is so controlled during the reduction of temperature as to be materially decreased even though and at the same time the butter fat becomes, with its acquiring of a lower temperature, more susceptible to agglomeration.

It is apparent that the above described cooling process is not limited to pasteurization. For example, already pasteurized and partially cooled cream to which starter may have been added for the development of acid and flavor prior to churning is held at a ripening temperature for a time determined by the degree of acid and aroma wanted. This process when completed is known as ripening of cream and must be followed by still further reduction of temperature to render the cream more favorable to churning. However, as the temperature decreases the susceptibility of the fat to pre-churning is very greatly increased, consequently the above method of controlling agitation in the vat during the final cooling just prior to introduction of the cream to the churn became very apparent as undesirable pre-churning affects both the body and keeping quality of the butter.

The above described cooling process has been found to be essential for the development of viscosity in cream when advantage is to be taken of its colloidal properties in order to produce an abnormal thickening which it is desirable to fix at an approximately uniform amount by proper control and adjustment of agitation; more particularly in combination with a rapid and accurate adjustment of cooling medium temperature, especially at temperatures when the heated cream offers the maximum potential viscosity.

It is of course understood that the degree of concussion to which cream may be subjected to without setting up a ruinous degree of agglomeration of butter fat particles is at times altered by the natural characteristics of the fat which varies with the different breeds of cows, the feeds used, the period of lactation, and the season of the year and other factors. However, regardless of the individual and specific characteristics of any particular butter fat to be treated, its ultimate viscosity after heating for pasteurization will be materially increased by reducing and properly adjusting the total amount of concussion to which the cream is subjected during cooling more or less in accordance with temperature decrease and individual capacity of the cream to withstand concussion.

The above described treatment of cream is not limited to the use of any particular type apparatus and the apparatus herein disclosed is merely one example of apparatus suitable for practicing the invention and it is to be understood that the treatment may be effected with any other suitable type apparatus. The agitator may be one having no provision for the passage of heating and cooling media, but which moves the cream into contact with a heated or cooled surface such as that provided by the wall of the vat in combination with the surrounding jacket.

I claim:

1. The method of cooling heated cream which comprises passing cooling medium in heat exchange therewith, agitating the cream and controlling the degree of agitation in accordance with temperature decrease to minimize agglomeration of butter-fat globules.

2. The method of cooling cream which comprises passing cooling medium in heat exchange therewith, agitating the cream and reducing the degree of agitation in accordance with temperature decrease to minimize agglomeration of butter fat globules.

3. The method of cooling heated cream which comprises passing cooling medium in heat exchange relation therewith, agitating the cream, controlling the temperature of the cream by progressively lowering the temperature of the cooling medium, adjusting the degree of agitation of the cream in accordance with temperature decrease of the cream to minimize agglomeration of butter fat globules.

4. The method of cooling heated cream which comprises passing cooling medium into heat exchange relation therewith, agitating the cream, controlling the temperature of the cream by progressively lowering the temperature of the cooling medium, and reducing the degree of agitation of the cream in accordance with temperature decrease thereof to minimize agglomeration of butter fat globules.

5. In the pasteurization of cream, the method of cooling cream from pasteurization temperature which comprises passing cooling medium into heat exchange relation therewith, agitating the cream, and, at approximately the melting temperature of butter-fat, reducing the degree of agitation and progressively continuing such reduction in accordance with temperature decrease in the cream to minimize agglomeration of butter-fat globules.

6. In the pasteurization of cream, the method of cooling cream from the temperature of pasteurization which comprises passing a cooling medium into heat exchange relation with the cream, agitating the cream, controlling the temperature of the cream by progressively lowering the temperature of the cooling medium, and, at approximately the melting temperature of butter-fat, reducing the degree of agitation and progressively continuing such reduction as the temperature decreases in the cream to minimize agglomeration of butter fat globules.

7. The method of cooling cream after pasteurization which comprises passing cooling medium in heat exchange relation therewith, simultaneously agitating the cream and simultaneously reducing the degree of agitation at approximately the melting temperature of butter fat and at approximately the congealing temperature of butter fat.

8. The method of cooling cream after pasteurization which comprises passing cooling medium in heat exchange therewith, simultaneously agitating the cream and progressively reducing the degree of agitation at approximately the melting temperature of butter-fat, at approximately the congealing temperature of butter-fat and at approximately churning temperature.

9. The method of cooling heated cream which comprises passing cooling medium in heat exchange therewith, agitating the cream and progressively reducing the degree of agitation according to temperature decrease and making the agitation reductions at more than one stage after the cream temperature reaches the optimum temperature conducive to clustering of butter-fat.

10. In the method of cooling cream wherein a batch is cooled by means of a moving agitator through which cooling medium is passed, the step which comprises reducing the speed of the agitator in accordance with temperature decrease in the cream to minimize agglomeration of butter-fat globules.

11. In the method of cooling cream wherein a batch is cooled by means of a moving agitator through which cooling medium is passed, the steps which comprise controlling the temperature of the cream by progressively lowering the temperature of the cooling medium and reducing the speed of the agitator as the temperature decreases in the cream to minimize agglomeration of fat particles.

12. In the pasteurization of cream wherein a batch is heated to pasteurizing temperature and then cooled by means of a moving agitator through which heating and cooling media are successively passed, the improved method which comprises operating the agitator at different speeds in accordance with temperature increase of the cream during heating, operating the agitator at the same speed during the initial cooling stage as during the final heating stage, and reducing the agitator speed in accordance with temperature decrease to reduce agglomeration of the butter fat particles.

13. In the pasteurization of cream wherein a batch is heated to pasteurizing temperature and then cooled by means of a moving agitator through which heating and cooling media are successively passed, the improved method of cooling which comprises initially operating the agitator at the same speed as during heating and, after the temperature drops nearly to the melting point of butter-fat, progressively reducing the agitator speed in accordance with temperature decrease to avoid substantial agglomeration of butter-fat globules.

14. In the pasteurization of cream wherein a batch is heated to pasteurization temperature and then cooled by means of a moving agitator through which heating and cooling media are successively passed, the improved method of cooling which comprises initially operating the agitator at the same speed as during heating, controlling the temperature of the cream by progressively lowering the temperature of the cooling media, and after the temperature drops substantially to the melting point of butter fat, progressively reducing the agitator speed in accordance with temperature decrease to minimize the agglomeration of butter-fat globules.

15. In the pasteurization of cream wherein a batch is heated to pasteurizing temperature and then cooled by means of a moving agitator through which heating and cooling media are successively passed, the improved method of cooling which comprises initially operating the agitator at the same speed as during heating and after the temperature drops substantially to the melting point of butter fat, reducing the agitator speed, and after the temperature drops, substantially to the congealing point of butter-fat, progressively reducing the agitator speed in accordance with temperature decrease to avoid substantial agglomeration of butter-fat globules.

16. In the pasteurization of cream wherein a batch is heated to pasteurization temperature and then cooled by means of a moving agitator through which heating and cooling media are successively passed, the improved method of cooling which comprises initially operating the agitator at the same speed as during heating, controlling the temperature of the cream by progressively lowering the temperature of the cooling medium, and after the temperature drops substantially to the melting point of butter fat, reducing the agitator speed, and after the temperature drops substantially to the congealing point of butter fat, progressively reducing the agitator speed in accordance with temperature decrease to minimize agglomeration of butter fat globules.

FRITZ G. CORNELL, Jr.